ated Oct. 3, 1967

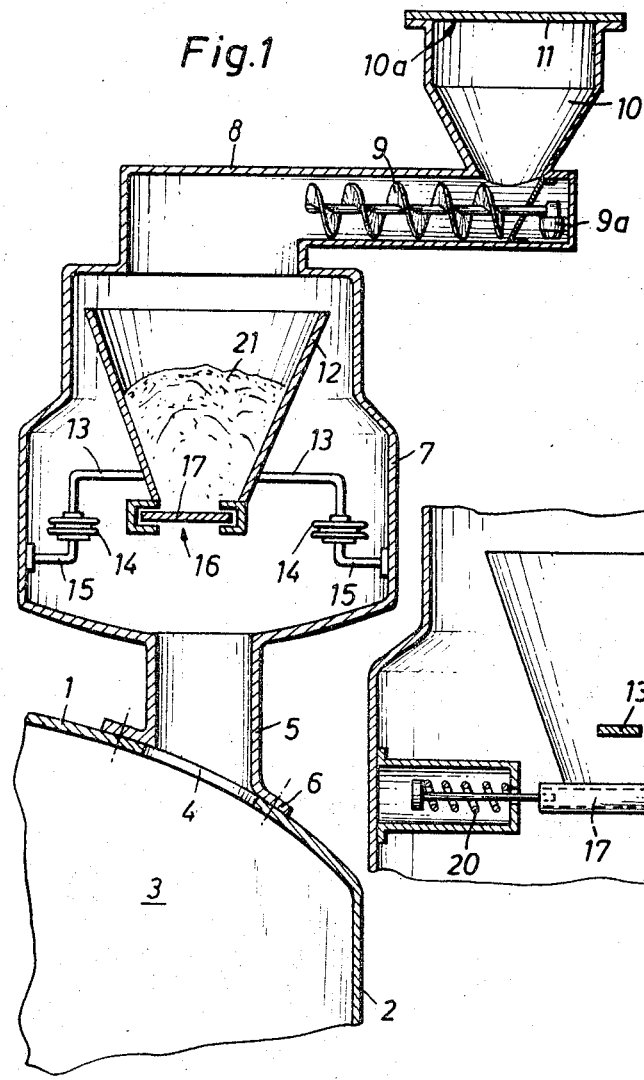

United States Patent Office 3,345,055

3,345,055
ADDITIVE MEASURING DEVICE FOR VACUUM DEGASIFICATION VESSELS
Horst Kutscher, Dortmund-Berghofen, and Eugen Vopel, Dortmund, Germany, assignors to Dortmund-Horder Hullenunion Aktiengesellschaft, Dortmund, Germany
Filed June 16, 1964, Ser. No. 375,447
Claims priority, application Germany, July 16, 1963, D 27,173
6 Claims. (Cl. 266—34)

ABSTRACT OF THE DISCLOSURE

Device for adding measured quantities of aditive to metal melt being degasified in the vacuum chamber of a degasifying apparatus includes a container for the additive in vacuum-tight communication with the vacuum chamber, the container having a variable opening for discharging additive contained in the container into the vacuum chamber, means for weighing the additive contained in the container, and indicating means located externally of the vacuum chamber and operatively connected with the weighing means for indicating the weight of the additive measured thereby. Also included are means located externally of the vacuum chamber and operatively connected with the additive container for infinitely varying the discharge opening between fully closed and fully opened conditions thereof so as to discharge a continuously variable quantity of the additive from the container into the vacuum chamber.

In the vacuum degasification of metal melts, for example steel melts, additives which form an alloy with or chemically influence the melt frequently have to be added during the degasification process. In the case of a steel melt the additives are, interalia, aluminium, manganese and titanium.

In many cases the amount of additive which will be needed is not known before degasification begins and is not found out until during the degasification process. The vacuum chamber in which degasification is being carried out then has to be opened so that the quantity of additive which has been weighed out outside the vessel can be added. This causes an undesirable interruption to the process.

The object of the invention is to provide an apparatus by means of which additives can be added in measured quantities during degasification without any interruption to the degasification process, i.e. without any opening of the vacuum vessel.

To this end, according to this invention we provide an apparatus for degasifying metal melts including a vacuum chamber, a container for the additive in vacuum tight communication with the chamber, a weighing device which measures the weight of additive in the container and indicates it outside the chamber and means operable from outside the chamber for discharging additive from the container into a melt in the chamber.

One example of an apparatus in accordance with the invention is illustrated diagrammatically in the accompanying drawings in which:

FIGURE 1 is a vertical section through the apparatus; and,

FIGURE 2 is another vertical section through the apparatus at right angles to the first section.

Only the top part of the degasification vessel has been illustrated and this includes a top curved wall 1 and a side wall 2 of a jacket enclosing the degasification chamber. A vacuum is maintained continuously during the degasification process in the chamber 3.

The wall 1 is formed with an aperture 4 to which an auxiliary vessel 7 is connected by a pipe 5 and flange 6, there being the same vacuum inside the vessel 7 as in the degasification chamber 3. The vessel 7 is provided with a charging device consisting of a housing 8 containing a feed screw 9 and a hopper 10. The screw 9 is coupled to a driving motor 9a disposed inside the evacuated housing 8. The opening 10a of the hopper 10 is vacuum-sealed by a lid 11. The hopper 10 may be disposed beneath a storage bunker (not shown).

Beneath the charging device the vessel 7 contains a hopper-shaped container 12 which is supported by struts 13 from force-measuring units 14 on supports 15 fitted to the vessel wall. The units 14 are connected by electrical leads (not shown) to a measuring circuit which is used to determine the weight in the container 12. The bottom of the container 12 has an outlet aperture 16 closed by a slide 17. The latter can be opened by means of a solenoid 18 which, when energised, acts on a core 19 connected to the slide. During opening, the solenoid 18 operates against a coil spring 20 which pulls the slide back into the closed position after de-energisation.

Before degasification begins, the supply container 10 is filled with the required additive with the lid 11 open and some of the additive is brought into the hopper-shaped container 12 with the slide 17 closed. If possible, this amount exceeds the maximum quantity of additive expected. The lid 11 is then closed to make the entire interior vacuum-tight, so that the melt degasification can now begin. At a suitable time during the degasification process the slide 16 is opened by energisation of the solenoid 18 after the amount of additive required has been determined and without any interruption or breakdown of the vacuum, until the weighing circuit connected to the units 14 shows that the required quantity has left the container 12 and entered the chamber 3 of the degasification vessel, whereupon the slide 17 is closed. Again, if very large quantities have to be added, the container 12 can be re-filled by rotation of the screw 9, the lid 11 being closed and the vacuum maintained.

We claim:

1. In apparatus having a vacuum chamber for degasifying a metal melt, device for adding measured quantities of additive to the melt as the melt is being degasified, comprising a container for the additive in vacuum-tight communication with the vacuum chamber, said container having a variable opening for discharging additive contained in said container into the vacuum chamber, means for weighing the additive contained in said container, indicating means located externally of the vacuum chamber and operatively connected with said weighing means for indicating the weight of the additive measured thereby, and means located externally of the vacuum chamber and operatively connected with said additive container for infinitely varying said discharge opening between fully closed and fully opened conditions thereof so as to discharge a continuously variable quantity of the additive from said container into the vacuum chamber.

2. Apparatus according to claim 1, wherein said means for infinitely varying said discharge opening of said container comprises a slide operatively slidable across said discharge opening for closing said opening after only part of the additive in said container has been discharged therefrom.

3. Apparatus according to claim 1, wherein said weighing means comprises at least one electrical force-measuring device supporting said container.

4. Apparatus according to claim 1, including means defining a supply opening for supplying additive to said container, and sealing means for vacuum-tightly closing said supply opening.

5. Apparatus according to claim 1, including a vacuum-tight auxiliary vessel surrounding said container and located above and in vacuum-tight communication with the vacuum chamber.

6. Apparatus according to claim 5, including a supply hopper forming part of said auxiliary vessel and communicating with said additive container, said supply hopper having an opening for supplying additive thereto, and conveyor means located in said auxiliary vessel between said supply hopper thereof and said container for conveying additive from said supply hopper to said container.

References Cited

UNITED STATES PATENTS

| | | | |
|---|---|---|---|
| 2,646,904 | 7/1953 | Chodziesner | 222—77 X |
| 2,692,196 | 10/1954 | Hulme | 266—34 X |
| 2,727,937 | 12/1955 | Boyer | 266—34 |
| 2,876,147 | 3/1959 | Kniepkamp et al. | 266—34 X |
| 2,940,620 | 6/1960 | Haas | 266—34 |

J. SPENCER OVERHOLSER, *Primary Examiner.*

E. MAR, *Assistant Examiner.*